United States Patent
Lin

(10) Patent No.: US 9,358,641 B2
(45) Date of Patent: Jun. 7, 2016

(54) LASER MACHINING DEVICE

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 14/257,003

(22) Filed: Apr. 21, 2014

(65) Prior Publication Data

US 2014/0319109 A1  Oct. 30, 2014

(30) Foreign Application Priority Data

Apr. 26, 2013  (TW) .............................. 102115125 A

(51) Int. Cl.
| | |
|---|---|
| B23K 26/02 | (2014.01) |
| B23K 26/08 | (2014.01) |
| B23K 26/38 | (2014.01) |
| B23K 26/04 | (2014.01) |

(52) U.S. Cl.
CPC .............. *B23K 26/38* (2013.01); *B23K 26/048* (2013.01)

(58) Field of Classification Search
CPC .... B23K 1/0056; B23K 9/1274; B23K 26/36; B23K 26/34; B23K 26/08; B23K 26/00; B23K 26/02
USPC .......................................... 219/121.6–121.86
See application file for complete search history.

(56) References Cited

U.S. PATENT DOCUMENTS

| | | | | | |
|---|---|---|---|---|---|
| 3,950,095 | A | * | 4/1976 | Bouygues | B23K 26/0853 118/503 |
| 4,284,871 | A | * | 8/1981 | Mawson | B23K 7/102 219/121.54 |
| 5,079,400 | A | * | 1/1992 | Firlotte | B23K 11/28 219/86.21 |
| 5,118,918 | A | * | 6/1992 | Serrano | B23K 26/048 219/121.74 |
| 5,227,606 | A | * | 7/1993 | Weeks | B23K 26/123 219/121.67 |
| 5,406,044 | A | * | 4/1995 | Killian | B23K 9/205 219/98 |
| 6,797,917 | B1 | * | 9/2004 | Yamaoku | B23K 26/0732 219/121.67 |
| 8,304,689 | B2 | * | 11/2012 | Schmid | B23K 26/24 219/121.63 |
| 8,598,490 | B2 | * | 12/2013 | Hooper | H01L 21/6836 219/121.69 |
| 2001/0050273 | A1 | * | 12/2001 | Lefebvre | B23K 9/025 219/137 R |
| 2002/0181946 | A1 | * | 12/2002 | Brown | A61L 9/037 392/390 |
| 2005/0159840 | A1 | * | 7/2005 | Lin | B23P 6/002 700/245 |
| 2005/0242067 | A1 | * | 11/2005 | Bernhardt | B23K 15/00 219/121.14 |
| 2006/0151448 | A1 | * | 7/2006 | Abram | B23K 7/10 219/121.56 |
| 2007/0193989 | A1 | * | 8/2007 | Yamazaki | B23K 26/0823 219/121.83 |
| 2008/0290074 | A1 | * | 11/2008 | Speker | B23K 26/1482 219/121.6 |

* cited by examiner

*Primary Examiner* — David Angwin
*Assistant Examiner* — Michael LaFlame, Jr.
(74) *Attorney, Agent, or Firm* — Novak Druce Connolly Bove + Quigg LLP

(57) ABSTRACT

A laser machining device with a proximity-warning function in relation to a workpiece being machined includes a laser element and a position feedback unit. The laser element includes a laser head for emitting a focused laser beam and a movable member for moving the laser head. The position feedback unit is positioned on the movable member and connected to an alerting circuit. When an elastic contacting member in the position feedback unit is compressed because the distance between the laser head and the workpiece is less than a minimum permitted distance the alerting circuit issues an alert.

8 Claims, 2 Drawing Sheets

LASER MACHINING DEVICE

FIELD

The present invention relates to machining devices, and particularly to a laser machining device.

BACKGROUND

In laser machining, such as laser cutting engraving, a laser beam emitted from a laser head should be focused on a surface of a workpiece to be machined. Because different workpieces have different thicknesses, a height of the laser head relative to the workpieces requires to be adjusted and this can be problematic.

BRIEF DESCRIPTION OF THE DRAWINGS

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
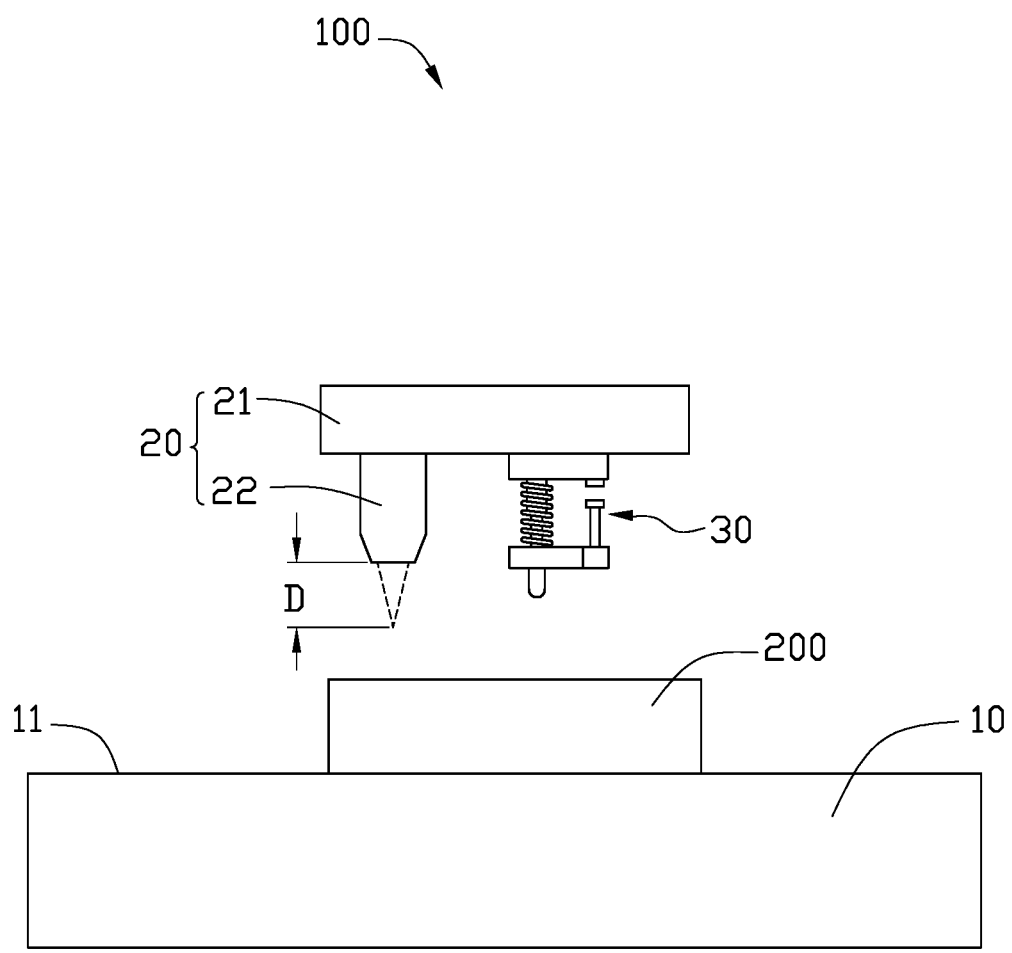
FIG. 1 is a schematic view of a laser machining device, according to an exemplary embodiment of the present disclosure, the laser machining device including a position feedback unit.
Figure 2:
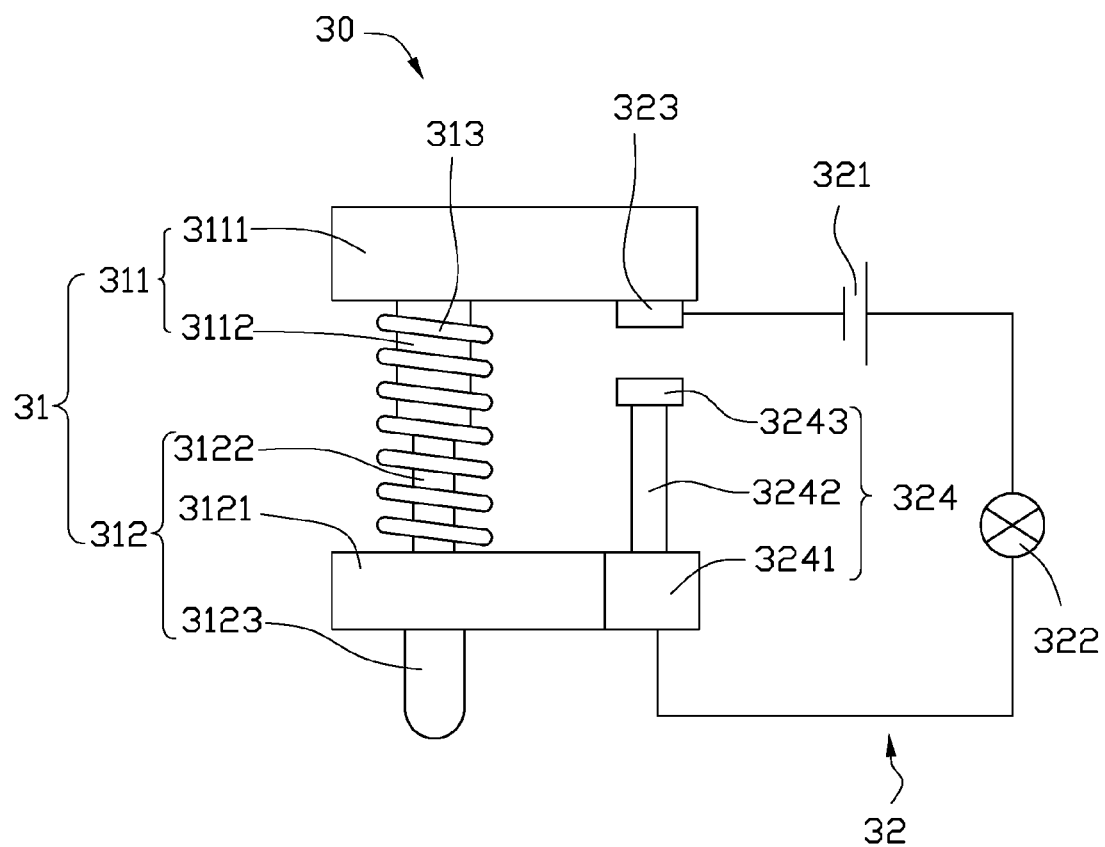
FIG. 2 is a schematic view of the position feedback unit of the laser machining device of FIG. 1.

FIGS. 1 and 2 show one embodiment of a laser machining device 100. The laser machining device 100 is configured for machining a workpiece 200. The laser machining device 100 includes a supporting base 10, a laser element 20, and a position feedback unit 30 fixedly connected to the laser element 20.

The supporting base 10 includes a working surface 11, the workpiece 200 being fixedly positioned on a predetermined position of the working surface 11. Different workpieces 200 may have different thicknesses.

The laser element 20 is positioned above the working surface 11 of the workpiece 200, the laser element 20 is movable along a first direction substantially parallel to the working surface 11 and a second direction substantially perpendicular to the working surface 11. The laser element 20 includes a movable member 21 and a laser head 22 fixed on the movable member 21. The movable member 21 drives the laser head 22 to move along the first direction and the second direction. In detail, the movable member 21 is a three-dimensional robot arm. The laser head 22 emits a focused laser beam. A distance from a distal end of the laser head 22 facing toward the supporting base 10 to a focal point of the laser head 22 is D, and the distance D equals a distance between the laser head 22 and the workpiece 200 in a laser machining process.

The position feedback unit 30 is fixed on the movable member 21 and is fixed relative to the laser head 22. The position feedback unit 30 includes an elastic contacting member 31 and an alerting circuit 32. The elastic contacting member 31 includes an upper portion 311 fixed on the movable member 21, a lower portion 312 connected to the upper portion 311, and an elastic portion 313 positioned between the upper portion 311 and the lower portion 312. The upper potion 311 includes a first base 3111 and a barrel 3112 connected to the first base 3111. The lower portion 312 includes a second base 3121, a guiding bar 3122 formed on a surface of the second base 3121 facing toward the first base 3111, and a contacting protrusion 3123 formed on another surface of the second base 3121 facing toward the supporting base 10. The guiding bar 3122 is slidably inserted into the barrel 3112, a restricting structure (not shown) may be formed between the barrel 3112 and the guiding bar 3122 to prevent the guiding bar 3122 falling out of the barrel 3112. An end surface of the contacting protrusion 3123 is substantially a spherical surface. The elastic portion 313 is elastically sandwiched between the first base 3111 and the second base 3121. In this embodiment, the elastic portion 313 is a helical spring, the elastic portion 313 sleeves on the barrel 3112 and the guiding bar 3122, and the elastic portion 313 is between and abuts the first base 3111 and the second base 3121.

In use, when the elastic contacting member 31 is under maximum compression, a distance between the distal end of the contacting protrusion 3123 and the movable member 21 is larger than a distance between the distal end of the laser head 22 and the contacting protrusion 3123. When the elastic contacting member 31 is uncompressed, a distance between the distal end of the contacting protrusion 3123 and the movable member 21 is less than a distance between the focal point of the laser head 22 and the movable member 21.

The alerting circuit 32 is activated when a distance between the laser head 22 and the workpiece 200 is less than a permitted value, the permitted value is to prevent the laser head 22 from hitting the workpiece 200. The alerting circuit 32 includes a power source 321, an alerting device 322, a first electrode 323, and a second electrode 324 opposite to the first electrode 323 and spaced from first electrode 323 for a predetermined distance. The first electrode 323 is electrically connected to a positive end of the power source 321 and fixed on the first base 3111, and the second electrode 324 is electrically connected to a negative end of the power source 321 and is fixed on the second base 3121. In this embodiment, the first electrode 323 is a conductive piece 323, the second electrode 323 includes a bottom base 3241, a supporting post 3242 fixed on the bottom base 3241 and protruding toward the first electrode 323, and an electrode piece 3243 fixed on an distal end of the supporting post 3242. The supporting post 3242 is made from an elastic material, and the supporting post 3242 is electrically connected to the negative end of the power source 321 by a wire (not shown) passing through the bottom base 3241 and the supporting post 3242. In another embodiment, the structure of the first electrode 323 is similar to that of the second electrode 324, the first electrode 323 and the second electrode 324 are interchangable. The alerting device 323 emits a signal when the first electrode 323 and the second electrode 324 contact each other. The alerting signal can be an audible signal, a visual signal, or other type of signal. Specifically, the alerting device 322 can be a beeper or a light-emitting diode (LED).

A distance between the first electrode 323 and the second electrode 324 can be set according to different requirements. In this embodiment, a minimum permitted distance between the distal end of the laser head 22 and the workpiece 200 is preset, and the minimum permitted distance keeps the laser head 22 from hitting the workpiece 200 in a process of adjustment. When the first electrode 323 and the second electrode 324 contact each other, a distance between the laser head 11 and the workpiece 200 is equal to the minimum permitted distance. The minimum permitted distance is less than the distance D.

In use, the workpiece 200 is positioned at a predetermined position of the working surface 11, a machining position of the laser element 20 is adjusted according to a particular thickness of the workpiece 200, and then a laser machining process is started. In the adjusting process, if a distance between the distal end of the laser head 22 and the workpiece 200 is less than the minimum permitted distance, the elastic contacting member 31 contacts the workpiece 200, the workpiece 200 presses the second base 3121 to move toward the first base 3111, the second electrode 324 contacts the first electrode 323 during the movement of the second base 3121, causing the alerting device 322 send a warning to an operator. Therefore, collisions between the laser element 20 and the workpiece 200 during the adjusting process are avoided, preventing damage to the laser element 20 and the workpiece 200.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A laser machining device for machining a workpiece, comprising:
    a laser element, comprising:
        a laser head for emitting a laser beam and focusing the laser beam; and
        a movable member for driving the laser head to move relative to the workpiece; and
    a position feedback unit positioned on the movable member, comprising:
        an elastic contacting member, the elastic contacting member being compressed when a distance between the laser head and the workpiece being less than a minimum permit distance between the laser head and the workpiece; and
        an alerting circuit, the alerting circuit generating an alert when the elastic contacting member being compressed;
    wherein the elastic contacting member comprises an upper portion fixed on the movable member, a lower portion slidably connected to the upper portion, and an elastic portion elastically positioned between the upper portion and the lower portion; and
    wherein the upper potion comprises a first base and a barrel connected to the first base, the lower portion comprises a second base and a guiding bar formed on a surface of the second base facing toward the first base, the guiding bar is slidably inserted into the barrel, the elastic portion sleeves on the barrel and the guiding bar, and two opposite ends of the elastic portion respectively contact the first base and the second base.

2. The laser machining device of claim 1, wherein the alerting circuit comprises a power source, an alerting device, a first electrode, and a second electrode opposite to the first electrode and spaced from first electrode for a predetermined distance, the first electrode is electrically connected to a positive end of the power source and fixed on the first base, and the second electrode is electrically connected to a negative of the power source and is fixed on the second base.

3. The laser machining device of claim 2, wherein the second electrode comprises a bottom base fixed on the second base, a supporting post fixed on the bottom base and protruding toward the first electrode, and an electrode piece fixed on an distal end of the supporting post.

4. The laser machining device of claim 3, wherein the supporting post is made from an elastic material.

5. The laser machining device of claim 4, wherein the alerting device is selected from one of a group consisting of a beeper and a light-emitting diode.

6. The laser machining device of claim 1, wherein the second base comprises a contacting protrusion formed on a surface away from the first base.

7. The laser machining device of claim 6, wherein an end surface of the contacting protrusion is substantially a spherical surface.

8. The laser machining device of claim 1, wherein the elastic portion is a helix spring.

* * * * *